3,457,290
PREPARATION OF TRISILOXANES
Terry G. Selin, Schenectady, N.Y., assignor to General Electric Company, a corporation of New York
No Drawing. Filed Dec. 19, 1966, Ser. No. 602,478
Int. Cl. C07f 7/18
U.S. Cl. 260—448.2      8 Claims

ABSTRACT OF THE DISCLOSURE

A process for forming trisiloxanes having the formula:

$$(R)_3SiO(R')_2SiOSi(Y)_3$$

which comprises (A) forming a disiloxanolate having the formula:

$$(R)_3SiO(R')_2SiOM$$

by mixing a silanolate having the formula $$n(R)_3SiOM$$

with a cyclopolysiloxane having the formula $$[(R')_2SiO]_n$$

and (B) mixing a chlorosilane having the formula $$XSi(Y)_3$$

with a solution of the disiloxanolate formed in step (A), in a solvent inert to the reactants under the conditions of the reaction and (C) isolating the formed trisiloxane, where R is a monovalent hydrocarbon radical, R' is a member selected from the class consisting of hydrogen and monovalent hydrocarbon radicals, M is a member selected from the class consisting of lithium, sodium and potassium, Y is a member selected from the class consisting of monovalent hydrocarbon radicals, hydrogen, hydrocarbonoxy radicals, acyloxy radicals, and halogen; $n$ is an integer equal to from 3 to 5, inclusive, and X is halogen provided that R' is other than hydrogen when M is sodium or potassium.

---

This application relates to the preparation of trisiloxanes. In particular, this application relates to a process for the preparation of trisiloxanes which permits the introduction of a wide variety of silicon-bonded organic groups and other groups into a single molecule.

Trisiloxanes are well known in the art and are described in early silicone patents, such as Patent 2,469,888—Patnode. These trisiloxanes have a great utility in the art, but heretofore have generally been limited by virtue of the limited types of silicon-bonded groups available. Thus, in most trisiloxanes, all of the organo groups are the same silicon-bonded monovalent hydrocarbon radical, such as phenyl radicals or methyl radicals. The need has long beeen felt in the art for a process for the preparation of trisiloxanes which is not limited to any particular group of silicon-bonded substituents.

It is, accordingly, an object of the present invention to provide a process for the preparation of trisiloxanes having a variety of silicon-bonded groups.

This, and other objects of my invention, will be apparent from the following description.

In accordance with the present invention, there is provided a process for forming trisiloxanes having the formula:

(1)   $(R)_3SiO(R')_2SiOSi(Y)_3$ by a two-step process which involves (A) the formation of a disiloxanolate having the formula:

(2)   $(R)_3SiO(R')_2SiOM$ by reacting a silinolate having the formula:

(3)   $(R)_3SiOM$ with a cyclopolysiloxane having the formula:

(4)   $[(R')_2SiO]_n$ and (B) reacting the disiloxanolate of Formula 2 with a chlorosilane having the formula:

(5)   $XSi(Y)_3$ where R is a monovalent hydrocarbon radical, R' is hydrogen or a monovalent hydrocarbon radical, Y is a member selected from the class consisting of monovalent hydrocarbon radicals, hydrogen, hydrocarbonoxy radicals, acyloxy radicals and halogens, M is a member selected from the class consisting of lithium, sodium, and potassium, X is halogen, and $n$ is an integer equal to from 3 to 5, inclusive.

Illustrative of the monovalent hydrocarbons represented by R, R' and Y in the several formulas are, for example, alkyl radicals, e.g., methyl, ethyl, proply, butyl, octyl, octadecyl, etc. radicals; aryl radicals, e.g., phenyl, naphthyl, tolyl, xylyl, etc. radicals; aralkyl radicals, e.g., benzyl, phenylethyl, etc. radicals; alkenyl radicals, e.g., vinyl, allyl, etc. radicals; cycloaliphatic hydrocarbon radicals, e.g., cyclohexyl, cycloheptyl, cyclohexenyl, etc. radicals. Also included within the scope of the monovalent hydrocarbon radicals are substituted monovalent hydrocarbon radicals in which the substituents are inert under the conditions of the reaction of the present invention. The preferred classes of such substituted monovalent hydrocarbon radicals are halogenated aryl radicals and cyanoalkyl radicals. Included among the halogenated aryl radcals are chlorophenyl, dibromophenyl, trifluoromethylphenyl, trifluorophenyl, etc. radicals. Illustrative of the cyanoalkyl radicals which can be represented by R, R' and Y are beta-cyanoethyl, beta-cyanopropyl, gamma-cyanopropyl, etc. radicals. Other substituted radicals include radicals such as p-nitrophenyl, p-cyanophenyl, etc. radicals. Preferably, the radicals represented by R are a combination of methyl and phenyl radicals.

The types of trisiloxanes within the scope of Formula 1 are best understood by reference to the preparation of the disiloxanolate of Formula 2 and the subsequent reaction of the disiloxanolate of Formula 2 with the halosilane of Formula 5. The disiloxanolate of Formula 2 is prepared by reacting the silanolate of Formula 3 with the cyclopolysiloxane of formula 4 in the proportions and under the reaction conditions described below.

The silanolates of formula 3 include lithium, sodium, and potassium silanolates. From the definition of the R radical, it is apparent that a wide variety of silanolates are within the scope of Formula 3 and it should be understood that all three of the silicon-bonded R groups of the silanolate of formula 3 need not be the same. Illustrative of some of the silanolates within th escope of Formula 3 are, for example, sodium trimethylsilanolate, lithium trimethylsilanolate, potassium trimethylsilanolate, lithium dimethylphenylsilanolate, potassium diphenylmethylsilanolate, lithium triethylsilanolate, sodium tris-(p-chlorophenyl)silanolate, etc.

From the description of the R' radicals of Formula 4, it can also be seen that a wide variety of cyclopolysiloxanes are within the scope of Formula 4. From the definition of $n$ of Formula 4, it is seen that the cyclopolysiloxane is either a cyclotrisiloxane, a cyclotetrasiloxane, or a cyclopentasiloxane. It should be understood that the two silicon-bonded R groups in each of the siloxane units of the cyclopolysiloxane can be the same or different. Illustrative of various siloxane units which compose the cyclopolysiloxanes of Formula 4 are, for example, dimethylsiloxane, diphenylsiloxane, methylphenylsiloxane, methylvinylsiloxane, methyl-beta-cyanoethylsiloxane, methyl hydrogen siloxane, phenyl hydrogen siloxane, methylethylsiloxane, phenylethylsiloxane, phenylisopropylsiloxane, etc. Some of the most useful cyclopolysiloxanes within the scope of Formula 4 are hexamethylcyclotrisiloxane, octamethylcyclotetrasiloxane, hexaphenylcyclotrisiloxane, octaphenylcyclotetrasiloxane, the cyclic tetramer of methyl hydrogen polysiloxane, the cyclic tetramer of methylvinylsiloxane, etc.

The stoichiometry of the reaction involved in the process of preparing the disiloxanolates of Formula 2 is best understood from the following formula:

(6) $n(R)_3SiOM + [(R')_2SiO]_n \rightarrow (R)_3SiO(R')_2SiOM$

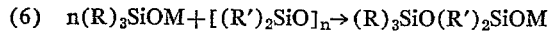

From the above equation, it is seen that one mole of the silanolate of Formula 3 is required to react with each siloxane unit in the cyclopolysiloxane of Formula 4 and this yields a number of moles of the disiloxanolate equivalent to the number of moles of siloxane units in the cyclopolysiloxanes. Thus, where the cyclopolysiloxane of Formula 4 is a cyclotetrasiloxane, four moles of the silanolate of Formula 3 are reacted with one mole of the cyclotetrasiloxane to produce four moles of the disiloxanolate of Formula 2.

While Equation 6 illustrates the stoichiometry of the reaction, it is often desirable to insure as rapid a reaction rate as possible, so that often an excess of the silanolate of Formula 3 is employed. Typical proportions of the silanolate are from about 1 to 2 times the ctoichiometric amount of the silanolate.

The reaction of the present invention which forms the disiloxanolate involves a starting silanolate which is a solid, a cyclopolysiloxane which be a solid or a liquid, and a disiloxanolate product which is usually a glassy solid or a viscous liquid. The reaction can be effected in presence or the absence of a suitable solvent, as will be discussed in more detail hereinafter. Where a solvent is used, it should be a solvent for both the starting silanolate, the cyclopolysiloxane, and the final disiloxanolate. The solvent must be readily isolable from the desired reaction products, must be inert to the reactants under the conditions of the reaction, and must be present in an amount sufficient to dissolve the reactants and reaction products. Generally, the solvent is present in an amount equal to from about 1 to 100 parts by weight per part by weight of the reaction mixture.

While Equation 6 illustrates the desired reaction of the present invention, there is also a secondary reaction which tends to use up the disiloxanolate of Formula 2. This competing reaction is as follows:

(7) $2(R)_3SiO(R')_2SiOM \rightarrow$
$(R)_3SiOSi(R)_3 + MOSi(R')_2OSi(R')_2OM$

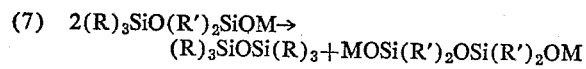

This secondary reaction is a redistribution reaction of the disiloxanolate into a disiloxane and a disiloxanediolate. Fortunately, this redistribution reaction does not proceed at as fast a rate as the reaction between the silanolate and the cyclopolysiloxane which produces the disiloxanolate of Formula 2 and does not occur at any measurable rate at room temperature, so that the effect of the redistribution reaction can be minimized in one of two ways. In the first method of minimizing the significance of the disproportionation reaction, the concentration of the disiloxanolate of Formula 2 is closely followed during its formation and as soon as the maximum amount is formed at the reaction temperature, the reaction mixture is cooled to room temperature. In the second method, instead of cooling the reaction mixture to room temperature, the disiloxanolate of Formula 2 is immediately reacted with the halosilane of Formula 5 before it has an opportunity to disproportionate, and as soon as it has reached a maximum concentration. Therefore, in carrying out the reaction between the silanolate of Formula 3 and the cyclopolysiloxane of Formula 4, the reaction mixture is heated to the reaction temperature, the progress of the reaction is carefully followed so that the point of formation of maximum disiloxanolate of Formula 2 is observed and then the reaction mixture is either cooled to prevent disproportionation of the disiloxanolate or reacted with the halosilane of Formula 5 to produce the trisiloxane.

The temperature at which the reaction between the silanolate of Formula 3 and the cyclopolysiloxane of Formula 4 is conducted is a function of whether a solvent is used and the nature of the particular solvent employed in the reaction mixture. In the preferred embodiment of my invention, a solvent is used and the preferred reaction temperautre is the reflux temperature of the particular solvent employed, which can vary from about 60° C. up to 200° C. or more, depending upon the particular reaction involved and the particular reaction solvent. However, it is understood that satisfactory reaction can be obtained when the reaction mixture is maintained at a temperautre below the reflux temperature of the reaction mixture so long as the temperature is in the range of from about 40° C. to 200° C. Where the reflux temperature is not employed as a reaction temperature, it is desired to stir the reaction mixture.

Whether or not a solvent is employed in the reaction of the present invention between the silanolate of Formula 3 and the cyclopolysiloxane of Formula 4 is a function of the particular reactants. When the silanolate of Formula 3 is a sodium or potassium silanolate, the question of solvent usage is a matter of convenience. When the reaction mixture is primarily solid at the reaction temperature, the presence of the solvent facilitates the conduct of the reaction. When one or both of the reactants are liquid at reaction temperature, the reaction can be conducted without any solvent.

While the above criteria are satisfactory guidelines with sodium or potassium silanolates of Formula 3, with a lithium silanolate the reaction requires the presence of a solvent. A surpising and unpredictable feature of the present invention is that while any type of solvent is satisfactory for reactions involving sodium or potassium silanolates, only a particular class of solvents can be used when the silanolate of Formula 3 is a lithium silanolate. With sodium or potassium silanolates, any solvent which is a solvent for the reactants and which is inert to the reactants under the conditions of the reaction can be employed. These solvents include all of the conventional hydrocarbon solvents, both aromatic and aliphatic, such as, for example, hexane, octane, benzene, toluene, xylene, naphthylenes, aromatic and aliphatic mineral spirits, and the like. In addition, another class of solvents useful for the reaction are the weakly basic aprotic solvents having an unshared pair of electrons in the molecule and which are inert to the reactants under the conditions of the reaction. Typical solvents of this class include ethers, such as diethyl ether, nitriles, such as acetonitrile and benzonitrile, tertiary amines, such as triethylamine, tripropylamine, tributylamine, dimethylaniline, diethylaniline, pyridine, and the piccolines. Other solvents include amines, such as dimethylformamide; sulfur compounds, such as dimethylsulfoxide; and cyclic ethers, such as tetrahydrofuran and tetrahydropyran.

While all of the many types of solvents described above are satisfactory when the reaction invloves sodium or potassium silanolates within the scope of Formula 3, only the weakly basic aprotic solvents having an unshared pair of electrons in the molecule as described above are satisfactory as the sole solvent when the reaction involves lithium silanolate. In addition to conducting reactions involving lithium silanolates of Formula 3 in a solvent which consists entirely of the aprotic solvents described above, it is also possible to conduct such reactions in a mixture of one of such aprotic solvents and one of the other hydrocarbon, oxygenated, or nitrile solvents described above which can be used as the total solvent with sodium or potassium silanolates.

Where a mixture of an aprotic solvent and a non-aprotic solvent are employed with a reaction mixture involving lithium silanolate, it is desirable that about 10% by weight of the total solvent be one of the aprotic solvents. These same mixtures of aprotic solvents and non-aprotic solvents are satisfactory for reactions involving sodium and potassium silanolates. The preferred aprotic solvent to be used alone or in combination with other solvents is tetrahydrofuran.

In addition to the difference in solvents required for silanolates containing lithium as compared with sodium and potassium silanolates, another difference is observed with respect to the cyclopolysiloxanes which are operative with respect to the various materials. With lithium silanolates within the scope of Formula 3, any of the cyclopolysiloxanes of Formula 4 previously described are satisfactory for use in the preparation of disilanolates within the scope of Formula 2, including hydrogen-containing cyclopolysiloxanes. However, with sodium and potassium silanolates, it is found that hydrogen-containing cyclopolysiloxanes of Formula 4 are not satisfactory. Therefore, when the silanolate of Formula 3 is a sodium or potassium silanolate, the permissible values of R' of the cyclopolysiloxane of Formula 4 do not include hydrogen. When an attempt is made to employ a hydrogen-containing cyclopolysiloxane with Formula 4 with a sodium or potassium silanolate, a decomposition and degradation of the cyclopolysiloxane to complex products is observed.

In carrying out the reaction of the present invention when a solvent is used, the silanolate of Formula 3 and the cyclopolysiloxane of Formula 4 are simply dissolved in the solvent, the reaction mixture is maintained at the reaction temperature for the desired time, with the course of the reaction being followed by any desirable technique, such as periodic gas chromatographic analysis of portions of the reaction mixture or periodic infrared analysis of portions of the reaction mixture to determine the point at which the maximum amount of the disiloxanolate of Formula 2 is formed. The reaction mixture is then maintained in the same solution whether it is to be reacted immediately with the silane of Formula 5 or whether it is to be cooled to stop the disproportionation reaction and subsequently reacted with the silane.

Where no solvent is used, the procedure is the same except that steps related to the solvent are omitted.

The silanes within the scope of Formula 5 include a wide variety of materials, including materials in which all of the silicon-bonded X and Y radicals are the same, in which the Y radicals are different from the X radicals, and in which the Y radicals are different from the X radicals and different from each other. Illustrative of the various silanes within the scope of Formula 5 are trimethylchlorosilane, triphenylbromosilane, triethyliodosilane, trimethylfluorosilane, diphenylmethylchlorosilane, methylethylphenylchlorosilane, silicon tetrachloride, trichlorosilane, diphenylchlorosilane, methylphenylchlorosiane, metyldiacetoxychlorosilane, triethoxychlorosilane, methyldimethoxyfluorosilane, methyl - beta-cyanoethyldichlorosilane, methyl - gamma-cyanopropyldichlorosilane, methyldiethoxychlorosilane, dimethylpropylchlorosilane, etc.

The second step of the reaction of the present invention involves the reaction of the disiloxanolate of Formula 2 with the silane of Formula 5 to produce the trisiloxane of Formula 1. This reaction is illustrated by the following equation:

(8) $(R)_3SiO(R')_2SiOM + XSi(Y)_3 \rightarrow$
$(R)_3SiO(R')_2SiOSi(Y)_3 + MX$

As shown by the above equation, the reaction to form the trisiloxane of Formula 1 involves equimolar amounts of the disiloxanolate and the silane, and results in the formation of lithium, sodium, or potassium halide. This reaction is a rapid, straightforward reaction, and the particular reaction conditions are relatively unimportant. Except when the silane contains more than one hydrolyzable group, the silane is preferably added slowly to the solution of the disiloxanolate and by the time the addition is completed, the reaction between the disiloxanolate and the silane is completed. When the silane contains more than one hydrolyzable group, the order of addition is reversed to insure that only the one X group is reacted. In some cases, for convenience of handling, it is desirable to employ a solution of the silane. Any desirable solvent can be employed, including the solvent previously employed to prepare the disiloxanolate, as well as any different solvent, so long as the solvent is inert to the reactants under the conditions of the reaction. Where a solvent is employed, it is convenient to employ from about 1 to 10 parts by weight of the solvent, based on the weight of the silane. The temperature at which the reaction between the silane and the disiloxanolate is conducted can vary widely with satisfactory reaction temperatures varying from room temperature, e.g., 20 to 30° C. up to the reflux temperature of the reaction mixture or the boiling point of the silane, which ever is lower. Reaction temperatures can range up to about 200° C.

The amount of silane of Formula 5 is preferably at least stoichiometric, so as to insure reaction of all of the disiloxanolate. Stoichiometric quantities are one mole of the silane of Formula 5 per mole of the disiloxanolate of Formula 2. In many cases, it is desirable to employ an excess of the silane of Formula 5 and, in such cases, the excess is about 10 to 150 percent excess.

After the reaction between the silane of Formula 5 and the disiloxanolate of Formula 2, the resulting product is a solution of the trisiloxane in the solvent plus the metal halide and any unreacted starting materials, as well as any products resulting from the competing redistribution reaction. Where the silane employed in the reaction mixture is one in which the various Y radicals are non-hydrolyzable, the trisiloxane can be separated conveniently from the reaction mixture by washing the reaction mixture to remove salts and silanolates and then fractionally distilling the resulting product to isolate the trisiloxane. Where the silane of Formula 5 contains silicon-bonded hydrolyzable groups represented by radicals Y, it is desirable to maintain the reaction product in an anhydrous state. In this situation, the reaction mixture is filtered to remove lithium, sodium, or potassium halides, and the resulting product is again fractionally distilled to produce the desired product.

The invention is illustrated, and in no sense limited, by the following examples. All parts are by weight unless indicated otherwise.

Example 1

Sodium 1,1,1-trimethyl-3,3 - diphenyldisiloxan-3-olate was prepared from sodium trimethylsilanolate and octaphenylcyclotetrasiloxane according to the following equation and description:

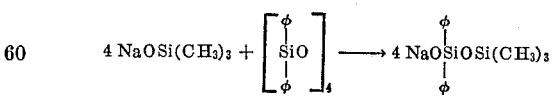

A 3-necked flask was equipped with a thermometer, reflux condenser, and magnetic stirrer. After flushing the system with nitrogen, the flask was charged with 49.5 g. (0.0625 mole) of $[(C_6H_5)_2SiO]_4$ and 135 g. of dry xylene. The resulting mixture was heated to reflux (about 140° C.), and to the resulting solution was added 28.0 g. (0.25 mole) of solid $NaOSi(CH_3)_3$ (sublimed). The resulting clear solution was then stirred at reflux (142° C.) for a period of one hour. The solution was then cooled to room temperature (20–25° C.).

The cooled solution was treated with 34.1 g. (0.25 mole) of n-propyldimethylchlorosilane, whereupon a mixture of sodium chloride dispersed in the xylene solution was formed. Sodium chloride was removed from the solution by several water washes. A clear, colorless solution remained. This solution was analyzed quantitatively by gas chromatography with 1-chloronaphthalene as an internal standard. This analysis showed that the siloxanes in the solution consisted of 75 mole percent 1,1,1,5,5-pentamethyl-3,3-diphenyl-5-n-propyltrisiloxane having the formula:

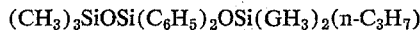

and with the remaining siloxanes being a variety of different materials, including 9.2 mole percent of:

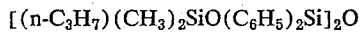

which resulted from the disproportionation of the sodium 1,1,1-trimethyl-3,3-diphenyldisiloxan-3 - olate into hexamethyldisiloxane and disodium 1,1,3,3 - tetraphenyldisiloxan-1,3-diolate and the reaction of the diolate with n-propyldimethylchlorosilane. The 1,1,1,5,5 - pentamethyl-3,3-diphenyl-5-n - propyltrisiloxane was isolated by fractional distillation as a liquid boiling at 121–122° C./0.4 mm. Hg.

Example 2

In order to determine the optimum reaction time period under the conditions of Example 1 and also to determine the fate of the disiloxanolate product, the procedure of Example 1 was repeated with the provision that small aliquots of the reaction mixture could be removed (by means of a syringe) and quantitatively analyzed. Thus, 5 ml. samples were removed from the refluxing reaction mixture at various time intervals and treated with excess n - propyldimethylchlorosilane to convert the silanolates present to the corresponding n-propyldimethylsiloxy derivatives. The resulting derivatives were then determined quantitatively by gas chromatography using 1-chloronaphthalene as an internal standard. On the basis of these analyses, the mole percent yields of sodium 1,1,1-trimethyl-3,3-diphenyldisiloxan-3 - olate and its decomposition product, disodium tetraphenyldisiloxane-1,3-diolate, could be determined. The table below summarizes the mole percent yields of these two products at various reaction times.

TABLE

| Reaction time (hrs.) | Mole percent $(CH_3)_3SiO(C_6H_5)_2SiONa$ | Mole percent $[(NaO)(C_6H_5)_2Si]_2O$ |
| --- | --- | --- |
| 0.25 | 51.5 | 2.0 |
| 1 | 78.4 | 9.6 |
| 2 | 73.8 | 11.5 |
| 4 | 66.2 | 17.0 |
| 6 | 61.4 | 20.0 |
| 10 | 59.7 | 21.9 |

Under these particular reaction conditions, it can be seen (Table I) that the yield of the disiloxanolate attains a maximum value during the first two hours then decreases steadily thereafter. Furthermore, the yield of the disiloxandiolate increases steadily at the expense of the disiloxanolate with increasing time of reaction.

Example 3

Sodium 1,1,1,3 - tetramethyl-3-β-cyanoethyldisiloxan-3-olate was prepared by reaction of sodium trimethylsilanolate and tetramethyltetra-β-cyanoethylcyclotetrasiloxane, viz.:

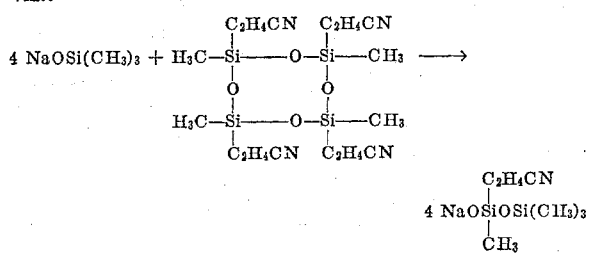

To a flask was added 22.6 g. (0.05 mole) of crystalline $[CH_3(\beta\text{-}C_2H_4CN)SiO]_4$ and 22.4 g. (0.2 mole) of sublimed $(CH_3)_3SiONa$. The solid reactants were dissolved in 100 ml. of dry benzene to insure homogeneity. The benzene was then removed by evaporation at reduced pressure and the reactants stirred and heated at 75° C. for one hour. The reaction mixture was then cooled and diluted with 100 ml. of dry benzene. This resulted in a two liquid phase system which was treated with 28.4 g. (0.3 mole) of $(CH_3)_2HSiCl$ dissolved in 25 ml. of benzene. After washing the benzene solution free of NaCl, gas chromatographic analysis indicated the presence (about 60%) of 1,1,1,3,5,5-hexamethyl-3-β-cyanoethyltrisiloxane,

Fractional distillation yielded the pure trisiloxane boiling at 106° C./14 mm. Hg.

Example 4

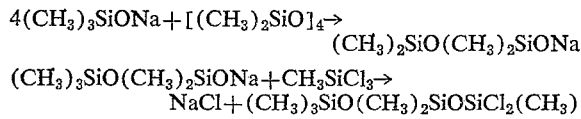

A mixture of 28 g. (0.25 mole) of sodium trimethylsilanolate and 14.8 g. (0.05 mole) of octamethylcyclotetrasiloxane was heated at 125° C. (with constant stirring) for a period of six hours. Following this heating period, the reaction mixture was cooled, diluted with 100 ml. of dry benzene, and transferred to an addition funnel. The silanolate solution was then added dropwise with stirring to a solution of 75 g. (0.5 mole) of methyltrichlorosilane in 200 ml. of dry benzene. The temperature of the reaction mixture during this addition was maintained below 35° C. by means of an external cooling bath. Following the addition of the silanolate, the mixture was filtered to remove the solid NaCl which had formed and the resulting filtrate fractionally distilled at reduced pressure. There was obtained 18.5 g. of 1,1,1,3,3,5-hexamethyl-5,5-dichlorotrisiloxane boiling at 68–69° C./20 mm. Hg containing 24.5% silicon-bonded chloride (theoretical Cl is 25.6%).

Example 5

Under moisture-free conditions, 22.4 g. (0.2 mole) of sodium trimethylsilanolate and 17.2 g. (.05 mole) of 1,3,5,7-tetramethyltetravinylcyclotetrasiloxane were heated and stirred at 125° C. for a period of two hours to produce sodium 1,1,1,3 - tetramethyl-3-vinyldisiloxan-3-olate. The resulting disiloxanolate was cooled, diluted with 50 ml. of dry benzene, and treated with 32.6 g. (0.3 mole) of trimethylchlorosilane (in 25 ml. of benzene). Following the exothermic reaction, the mixture was washed several times with water to remove the NaCl which had formed. The benzene product solution was finally isolated and fractionally distilled to produce 26.8 g. of 1,1,1,3,5,5,5-heptamethyl-3-vinyltrisiloxane boiling in the range 166–170° C. The product had $n_D^{25}$ 1.3951.

Example 6

A solution of sodium 1,1,1-trimethyl-3,3-diphenyldisiloxan-3-olate was also prepared from sodium trimethylsilanolate and hexaphenylcyclotrisiloxane utilizing the conditions of Example 1. Thus, 17.25 g. (0.15 mole) of sodium trimethyl silanolate, 29.7 g. (0.05 mole) of hexaphenylcyclotrisiloxane, and 88 g. of xylene were heated at reflux for a period of two hours. The mixture was cooled and treated with 20.5 g. (0.15 mole) of n-propyldimethylchlorosilane. After washing the xylene solution with water to remove NaCl, the product (i.e., 1,1,1,5,5-pentamethyl - 3,3-diphenyl-5-n-propyltrisiloxane) was recovered as in Example 1 in 70% yield.

Example 7

To a solution of 14.4 g. (0.15 mole) of lithium trimethylsilanolate in 75 ml. of dry tetrahydrofuran was added 11.1 g. (0.05 mole) of hexamethylcyclotrisiloxane. The resulting solution was refluxed (69° C.) for a period of 12 hours to produce lithium pentamethyldisiloxanolate. Then a 5 ml. aliquot was removed and treated with excess methyldiphenylchlorosilane. After washing the resulting mixture with water to remote tetrahydrofuran and LiCl, quantitative gas chromatographic analysis indicated that 1,1,1,3,3,5-hexamethyl-5,5-diphenyltrisiloxane was present in 73.4 percent yield.

Example 8

In a manner similar to that described in Example 7, 9.6 g. (0.1 mole) of lithium trimethylsilanolate and 6.0 g. (0.025 mole) of 1,3,5,7-tetramethylcyclotetrasiloxane [(CH$_3$)HSiO]$_4$, were combined with 85 ml. of dry tetrahydrofuran and the resulting mixture heated at 50° C. for a period of six hours. The quantity of 1,1,1,3-tetramethyl-disiloxan-3-olate present after this period of time was determined by treating a 5 ml. aliquot with excess methyldiphenylchlorosilane, filtering the mixture to remove lithium chloride, and analyzing the mixture by quantitative gas chromatographic techniques. Thus 1,1,1,3,5-pentamethyl-5,5-diphenyltrisiloxane was prepared in 61 percent yield.

While the foregoing examples have illustrated many of the embodiments of my invention, my invention relates broadly to the preparation of a class of trisiloxanes in which the silicon-bonded radicals can vary within wide limits. These compositions are prepared by reacting a disiloxanolate of the type described above with a silanol of the type previously described to produce the trisiloxane, a wide variety of which can be formed. This wide variety is based on the formation of the wide variety of disiloxanolates which can be prepared by reacting the aforementioned lithium, sodium, or potassium silanolates with a polydiorganosiloxane as previously described.

The trisiloxanes prepared by the process of the present invention not only have the same utility as prior art trisiloxanes, but also have the advantage of property differences resulting from the presence of various types of silicon-bonded radicals. Thus, where all of the radicals are silicon-bonded monovalent hydrocarbon radicals, variation in the radicals affects the vapor pressure, the temperature, viscosity coefficient, and the lubricating characteristics of these compositions. Depending upon the particular substituents present in these trisiloxanes, the materials are useful as heat transfer fluids, as dielectric fluids, and as antifoam agents. In addition, these compounds can be mixed with various fillers or thickening agents to convert the compositions to grease-like materials. Those trisiloxanes prepared by the process of the present invention which contain silicon-bonded hydrolyzable groups can be reacted further with other materials by known methods to form further useful organopolysiloxanes. For example, those compositions within the scope of the present invention in which the terminal silicon atom contains two silicon-bonded chlorine or acetoxy groups can be hydrolyzed to form linear polysiloxanes containing "dangling" disiloxanyl radicals. These compositions are also useful in the many applications in which other conventional organopolysiloxanes have found utility.

What I claim as new and desire to secure by Letters Patent of the United States is:

1. Process for forming trisiloxanes having the formula:

$$(R)_3SiO(R')_2SiOSi(Y)_3$$

which comprises (A) forming a disiloxanolate having the formula:

$$(R)_3SiO(R')_2SiOM$$

by mixing a silanolate having the formula $$n(R)_3SiOM$$

with a cyclopolysiloxane having the formula $$[(R')_2SiO]_n$$

and (B) mixing a chlorosilane having the formula $$XSi(Y)_3$$

with a solution of the disiloxanolate formed in step (A), in a solvent inert to the reactants under the conditions of the reaction and (C) isolating the formed trisiloxane, where R is a monovalent hydrocarbon radical, R' is a member selected from the class consisting of hydrogen and monovalent hydrocarbon radicals, M is a member selected from the class consisting of lithium, sodium, and potassium, Y is a member selected from the class consisting of monovalent hydrocarbon radicals, hydrogen, hydrocarbonoxy radicals, acyloxy radicals, and halogen; $n$ is an integer equal to from 3 to 5, inclusive, and X is halogen provided that R' is other than hydrogen when M is sodium or potassium.

2. The process of claim 1 in which step (A) is carried out in the presence of a solvent which is inert to the reactants under the conditions of the reaction.

3. The process of claim 2 in which M is a member selected from the class consisting of sodium and potassium.

4. The process of claim 2 in which M is lithium and the solvent involved in step (A) is an aprotic solvent having an unshared pair of electrons in the molecule.

5. The process of claim 4 in which the solvent is tetrahydrofuran.

6. The process of claim 2 in which R and R' and Y are each selected from the class consisting of methyl and phenyl radicals.

7. The process of claim 2 in which $n$ has a value of 3.

8. The process of claim 2 in which $n$ has a value of 4.

References Cited

UNITED STATES PATENTS 3,337,497   8/1967   Bostick _____ 260—448.2 X

OTHER REFERENCES

Eaborn: "Organosilicon Compounds," Academic Press Inc., New York (1960), p. 273.

TOBIAS E. LEVOW, Primary Examiner

P. F. SHAVER, Assistant Examiner

U.S. Cl. X.R.

260—448.8